US012502445B2

(12) United States Patent
Lee et al.

(10) Patent No.: US 12,502,445 B2
(45) Date of Patent: Dec. 23, 2025

(54) STERILIZATION DEVICE

(71) Applicants: JMICRO INC., Gwangmyeong-si (KR); KOREA ADVANCED INSTITUTE OF SCIENCE AND TECHNOLOGY, Daejeon (KR); DONGSHIN UNIVERSITY INDUSTRY-ACADEMY COOPERATION, Naju-si (KR)

(72) Inventors: Seung Seob Lee, Daejeon (KR); Ji Hun Jeong, Daejeon (KR); Jin Young Choi, Naju-si (KR); Jung Woo Lee, Daejeon (KR)

(73) Assignees: JMICRO INC., Gyeonggi-do (KR); KOREA ADVANCED INSTITUTE OF SCIENCE AND TECHNOLOGY, Daejeon (KR); DONGSHIN UNIVERSITY INDUSTRY-ACADEMY COOPERATION, Naju-si (KR)

( * ) Notice: Subject to any disclaimer, the term of this patent is extended or adjusted under 35 U.S.C. 154(b) by 344 days.

(21) Appl. No.: 18/249,073

(22) PCT Filed: Oct. 8, 2021

(86) PCT No.: PCT/KR2021/013905
§ 371 (c)(1),
(2) Date: Apr. 14, 2023

(87) PCT Pub. No.: WO2022/080778
PCT Pub. Date: Apr. 21, 2022

(65) Prior Publication Data
US 2023/0390438 A1    Dec. 7, 2023

(30) Foreign Application Priority Data
Oct. 15, 2020 (KR) .................. 10-2020-0133734

(51) Int. Cl.
*A61L 2/10* (2006.01)
*A61L 2/18* (2006.01)
*A61L 2/22* (2006.01)

(52) U.S. Cl.
CPC .................. *A61L 2/10* (2013.01); *A61L 2/18* (2013.01); *A61L 2/22* (2013.01); *A61L 2202/11* (2013.01);
(Continued)

(58) Field of Classification Search
CPC .................. A61L 2/10; A61L 2/18; A61L 2/22
See application file for complete search history.

(56) References Cited

U.S. PATENT DOCUMENTS 9,107,973 B1 *  8/2015  Robinson .................. A61L 2/22

FOREIGN PATENT DOCUMENTS

JP    2004-221020 A    8/2004
JP    2018-089543 A    6/2018
(Continued)

OTHER PUBLICATIONS

Kim, Jiwan. Oct. 14, 2020, inner pp. 1-2. non-official translation. Kaist Develops 'electrostatic atomization' Technology to Kill Corona 19 Virus with Water Droplets. Newspim article.
(Continued)

*Primary Examiner* — Sean E Conley
(74) *Attorney, Agent, or Firm* — NKL LAW; Jae Youn Kim (57) ABSTRACT

Provided is a sterilizing device including a wall portion defining an inner space together with a floor where an article to be sterilized and disinfected is located, and a cover located on the wall portion and covering the inner space, wherein each of the cover and the wall portion includes a first film having a plurality of micro nozzles for electrostati-
(Continued)

cally spraying water into the inner space, and light-emitting elements for irradiating ultraviolet light to the article.

6 Claims, 7 Drawing Sheets

(52) U.S. Cl.
CPC ..... *A61L 2202/122* (2013.01); *A61L 2202/15* (2013.01)

(56) References Cited

FOREIGN PATENT DOCUMENTS

| KR | 10-2012-0029758 A | 3/2012 |
|----|-------------------|--------|
| KR | 10-2015-0142163 A | 12/2015 |
| KR | 10-2019-0080273 A | 7/2019 |

OTHER PUBLICATIONS

Hong, J. H. et al. Electrical sterilization of *Escherichia coli* by electrostatic atomization with a photo-chemical catalyst. Journal of Electrostatics. vol. 69, No. 4, 2011, pp. 328-332 <https://doi.org/10.1016/j.elstat.2011.04.009>.

* cited by examiner

STERILIZATION DEVICE

TECHNICAL FIELD

An embodiment of the present disclosure relates to a sterilizing device.

BACKGROUND ART

Recently, due to environmental issues, shop cups, such as mugs, are more used instead of disposable cups in coffee shops, and a sharing economy in which many people share and use goods is being activated. In such an environment where a plurality of people use one object, contagious bacteria or viruses are highly likely to spread to people through the object. Therefore, disinfection and sterilization of articles is very important. In addition, in the case of infants whose immunity is weaker than adults, they are inevitably more vulnerable to bacterial infection than adults. Accordingly, when used by infants, baby products need to be subjected to more thorough hygiene management.

In general, since germs and the like are removed when exposed to ultraviolet light, disinfection and sterilization of articles may be performed by irradiating ultraviolet light. However, since light travels straight, in the case of articles having a curved shape, ultraviolet light do not reach the shaded portion and thus insufficient disinfection and sterilization are not performed.

DISCLOSURE

Technical Problem

Embodiments of the present disclosure provide a sterilizing device with improved sterilization effect.

Technical Solution

One embodiment of the present disclosure, provided is a sterilizing device including: a wall portion defining an inner space together with a floor where an article to be sterilized and disinfected is located; and a cover located on the wall portion and covering the inner space, wherein each of the cover and the wall portion includes a first film having a plurality of micro nozzles for electrostatically spraying water into the inner space, and light-emitting elements for irradiating ultraviolet light to the article.

Advantageous Effects of Disclosure

According to embodiments of the present disclosure, the sterilization efficiency of the sterilizing device can be improved by electrostatically spraying water together with irradiation of ultraviolet light.

MODE FOR INVENTION

One embodiment of the present disclosure, provided is a sterilizing device including: a wall portion defining an inner space together with a floor where an article to be sterilized and disinfected is located; and a cover located on the wall portion and covering the inner space, wherein each of the cover and the wall portion includes a first film having a plurality of micro nozzles for electrostatically spraying water into the inner space, and light-emitting elements for irradiating ultraviolet light to the article.

In an embodiment, the first film may include a first base layer that is a transparent film, and each of the plurality of micro nozzles may have a truncated cone shape protruding outward from a surface of the first base layer.

In an embodiment, each of the cover and the wall portion further includes a second film disposed on the first film and having a plurality of surrounding electrodes corresponding to the plurality of micro nozzles, respectively, wherein in a plan view, the plurality of surrounding electrodes may surround the plurality of micronozzles, respectively, and a voltage may be applied to the plurality of surrounding electrodes.

In an embodiment, each of the cover and the wall portion may further include a third film disposed on the second film and including a flow path for supplying water to the plurality of micro nozzles, wherein the second film includes a plurality of openings connecting the plurality of micro nozzles to the flow path, and the plurality of surrounding electrodes are disposed to surround the openings, respectively, to heat the water passing through the openings.

In an embodiment, an electric power unit including a fuel cell supplying the water to a sterilizing unit together with power may be further included.

In an embodiment, the fuel cell is a polymer electrolyte fuel cell, and humidified air in the sterilizing unit may be supplied to the fuel cell.

MODE FOR CARRYING OUT THE INVENTION

Since the present disclosure may be modified variously and may have various embodiments, some particular embodiments will be illustrated in the drawings and described in detail in the detailed description. Effects and features of the present disclosure and methods of achieving the same will be apparent with reference to embodiments described below in detail with reference to the drawings. However, the present disclosure is not limited to the embodiments disclosed below and may be implemented in various forms.

In the following embodiments, terms such as first and second are used for the purpose of distinguishing one element from another element without limiting meaning.

In the following embodiments, the singular expression includes the plural expression unless it is explicitly meant differently in the context.

In the following embodiments, the terms include or have mean that a feature or component described in the specification exists, and the possibility of adding one or more other features or components is not excluded in advance.

In the following embodiments, when a part such as a film, a region, a component, etc. is on or above another part, it includes not only a case directly on the other part, but also a case where another film, region, component, etc. is interposed therebetween.

In the drawings, the size of components may be exaggerated or reduced for convenience of description. For example, since the size and thickness of each component shown in the drawings are arbitrarily shown for convenience of description, the present disclosure is not necessarily limited to the illustrated.

Hereinafter, embodiments of the present disclosure will be described in detail with reference to the accompanying drawings, and the same reference numerals will denote the same or corresponding components when describing with reference to the drawings.

Figure 1:
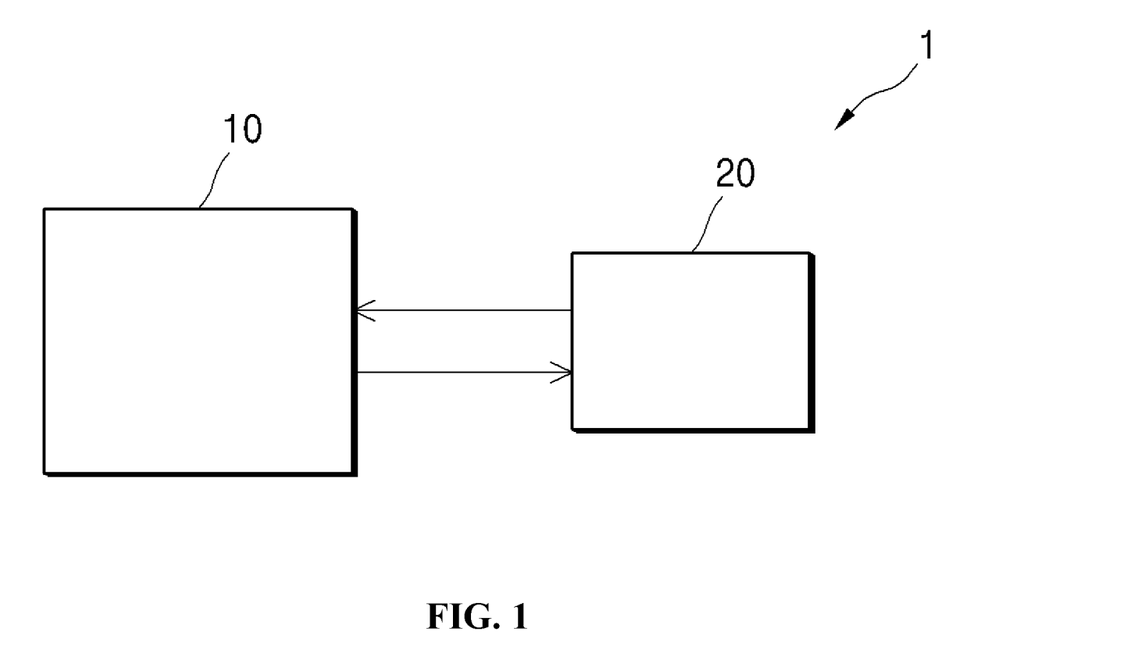
FIG. 1 shows a block diagram schematically showing a sterilizing device according to an embodiment of the present disclosure.
Figure 2:
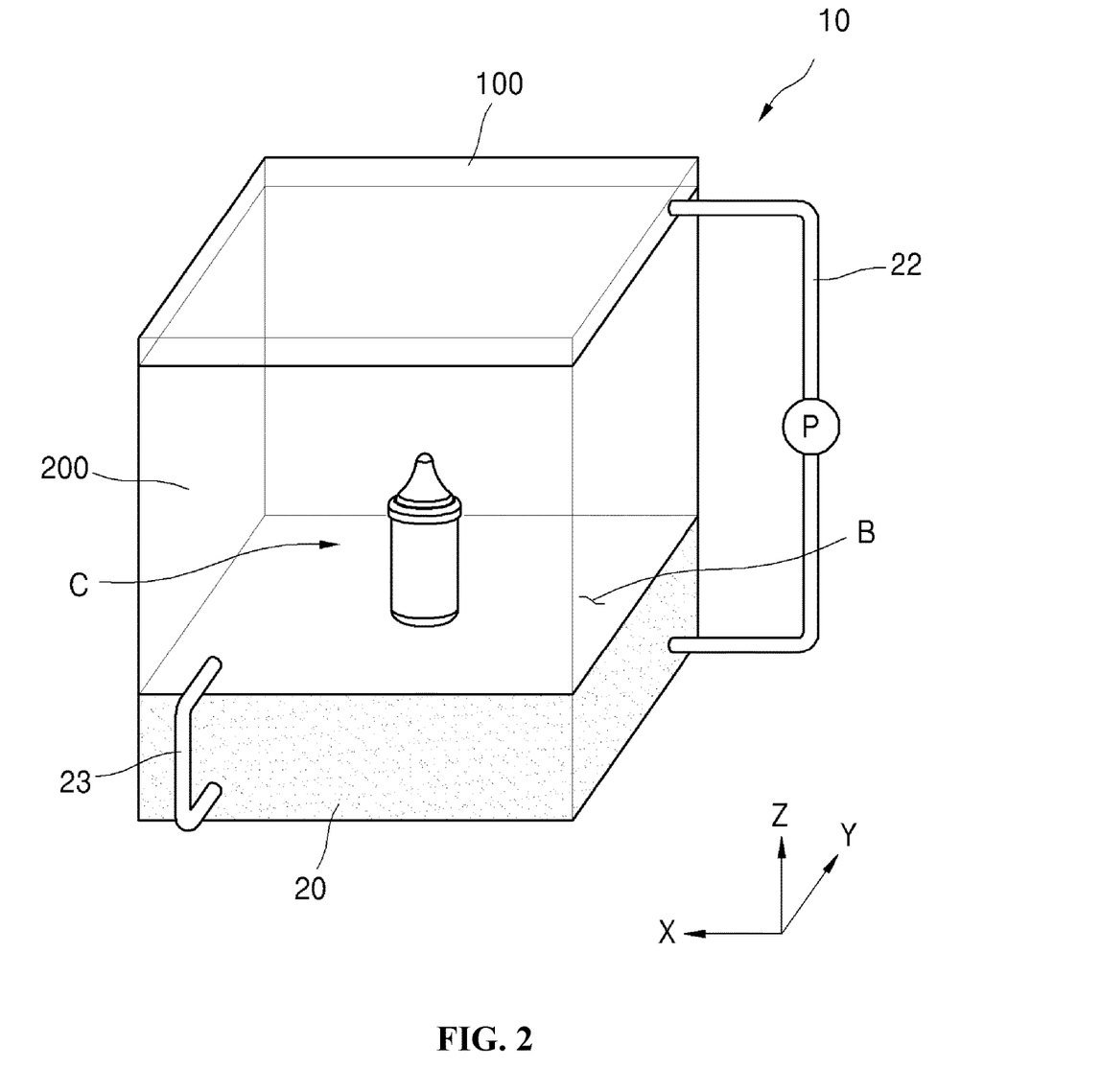
FIG. 2 shows a perspective view schematically illustrating an example of the sterilizing device of FIG. 1.

FIG. 1 shows a block diagram schematically showing a sterilizing device according to an embodiment of the present disclosure, and FIG. 2 shows a perspective view schematically illustrating an example of the sterilizing device of FIG. 1.

Referring to FIGS. 1 and 2, a sterilizing device 1 according to an embodiment of present disclosure may include a sterilizing unit 10 providing an inner space in which an article C to be sterilized and disinfected is located, and a electric power unit 20 which supplies power and water to the sterilizing unit 10.

FIG. 2 shows a baby bottle as an example of the article C to be sterilized and disinfected, and the article C is not limited thereto. For example, the article C may be an item that needs to be subjected to a hygiene treatment, such as shared items used by many people, baby items, cell phones, tableware, etc.

The sterilizing unit 10 may include, for example, a wall portion 200 defining an inner space together with a bottom B where article C is located, and a cover 100 positioned on the wall portion 200 and covering the inner space. The wall portion 200 and the cover 100 may have the same structure.

The wall portion 200 and the cover 100 may be integrally formed, or formed separately and then combined together. In addition, an entrance, which is selectively opened or closed, may be provided with at least one of the wall portion 200 and the cover 100, and thus the article C may be inserted into or withdrawn from the sterilizing unit 10.

Meanwhile, the sterilizing unit 10 may sterilize and disinfect the article C by electrostatically spraying water ($H_2O$) while irradiating the article C with ultraviolet light.

When water ($H_2O$) is electrostatically sprayed, the water may be ionized to the fine water droplets having strongly reactive negative ions, such as hydroxyl radical and superoxide radical, and the fine water droplets may be sprayed. Thus, as having high reducibility, the negative ions strongly react with positive hydrogen ions in microbial membranes or viruses existing on the surface of the target C and are reduced to water. Accordingly, the microbes and viruses may be inactivated by those processes.

In particular, since water may be electrostatically sprayed from the cover 100 and the wall portion 200 of the sterilizing unit 10, and the water electrostatically sprayed from the cover 100 and the wall portion 200 may reach the shaded portion of the article C where ultraviolet light may not reach, water ($H_2O$) can be electrostatically sprayed to the article C while ultraviolet light is irradiated thereto, thereby improving the sterilization and disinfection effect of the sterilizing unit 10.

Although the sterilizing unit 10 is illustrated as a substantially hexahedral shape and the electric power unit 20 is illustrated to be positioned under the sterilizing unit 10 in FIG. 8, the present disclosure is not limited thereto, and the position of the electric power unit 20 may be variously changed.

The electric power unit 20 may include a fuel cell. The fuel cell may include a polymer electrolyte fuel cell, an alkaline fuel cell, etc. The fuel cell may include an anode, a cathode, and an electrolyte between the anode and cathode.

Supplied hydrogen is oxidized to generate hydrogen ions and electrons at the anode, and the hydrogen ions move to the cathode via the electrolyte while the electrons move to the cathode along the external conductive line, to thereby generate electric energy. Hydrogen ions react with oxygen at the cathode to generate water.

The electric power unit 20 and the sterilizing unit 10 may be connected with each other via a first pipe 22, and thus, the water generated in the fuel cell may be supplied to the sterilizing unit 10. A pump P is mounted on the first pipe 22 and thus the water generated in the fuel cell may be easily supplied to the sterilizing unit 10. For example, the first pipe 22 may be connected to the cover 100, and the internal flow paths of the cover 100 and the wall portion 200 are connected to each other, so that the water supplied to the cover 100 may be sprayed from the cover 100 and the wall portion 200 to the inner space of the sterilizing unit 10.

Assuming that the power consumption of the sterilizing device 1 is about 2 kW per hour and the energy efficiency of the fuel cell is 60%, the hydrogen required for the fuel cell is about 0.084 kg, and the amount of water generated at this time is about 0.76 kg (0.76 L). That is, since a sufficient amount of water required for electrostatic spraying may be generated from the fuel cell of the power unit 20, the sterilizing device 1 according to the present disclosure may not separately supply water for electrostatic spraying from the outside.

In addition, electricity generated in the fuel cell may be used for overall operation of the sterilizing unit 10, such as driving of a light-emitting device for irradiating ultraviolet light and applying of voltage to water for electrostatically spraying.

In addition, the inner space of the sterilizing unit 10 and the electric power unit 20 may be connected to each other by a second pipe 23. Although not shown in the drawings, the second pipe 23 may include a valve, a pump, etc. The second pipe 23 may supply the air humidified in the sterilizing unit 10 to the fuel cell to prevent the decrease in the efficiency of the fuel cell in the electric power unit 20.

For example, when the fuel cell is a polymer electrolyte fuel cell and the polymer film is dried, the conductivity of the hydrogen ion decreases and the polymer film is contracted, and as a result, the contact resistance increases between the electrode and the polymer film, and the efficiency of the fuel cell is drastically reduced. However, when the humidified air in the inner space of the sterilizing unit 10 is continuously supplied to the electric power unit 20 through the second pipe 23, the reduction in the efficiency of the fuel cell caused by the above-described problem may be prevented.

That is, according to the present disclosure, the electric power and water generated from the fuel cell of the electric power unit 20 may be transferred to the sterilizing unit 10, and the humidified air in the sterilizing unit 10 may be transferred back to the electric power unit 20, to improve the efficiency of the fuel cell.

Figure 3:
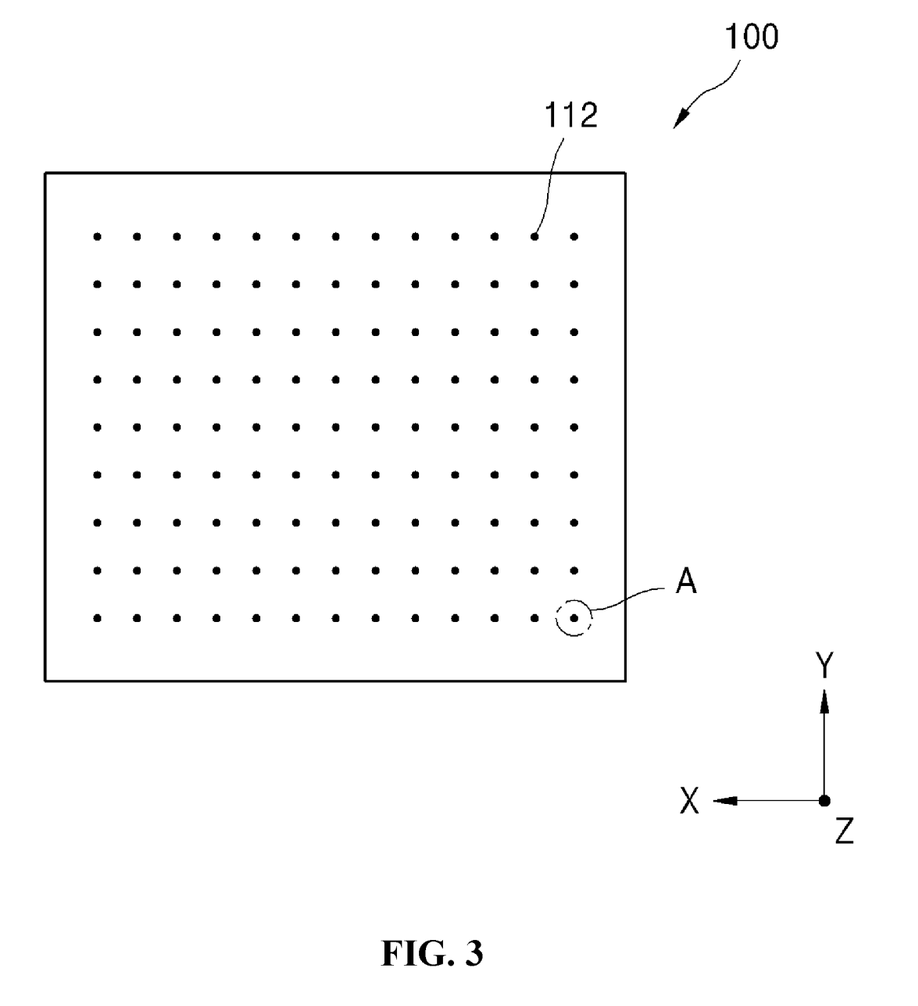
FIG. 3 shows a plan view schematically showing an example of a cover illustrated in FIG. 2.
Figure 4:
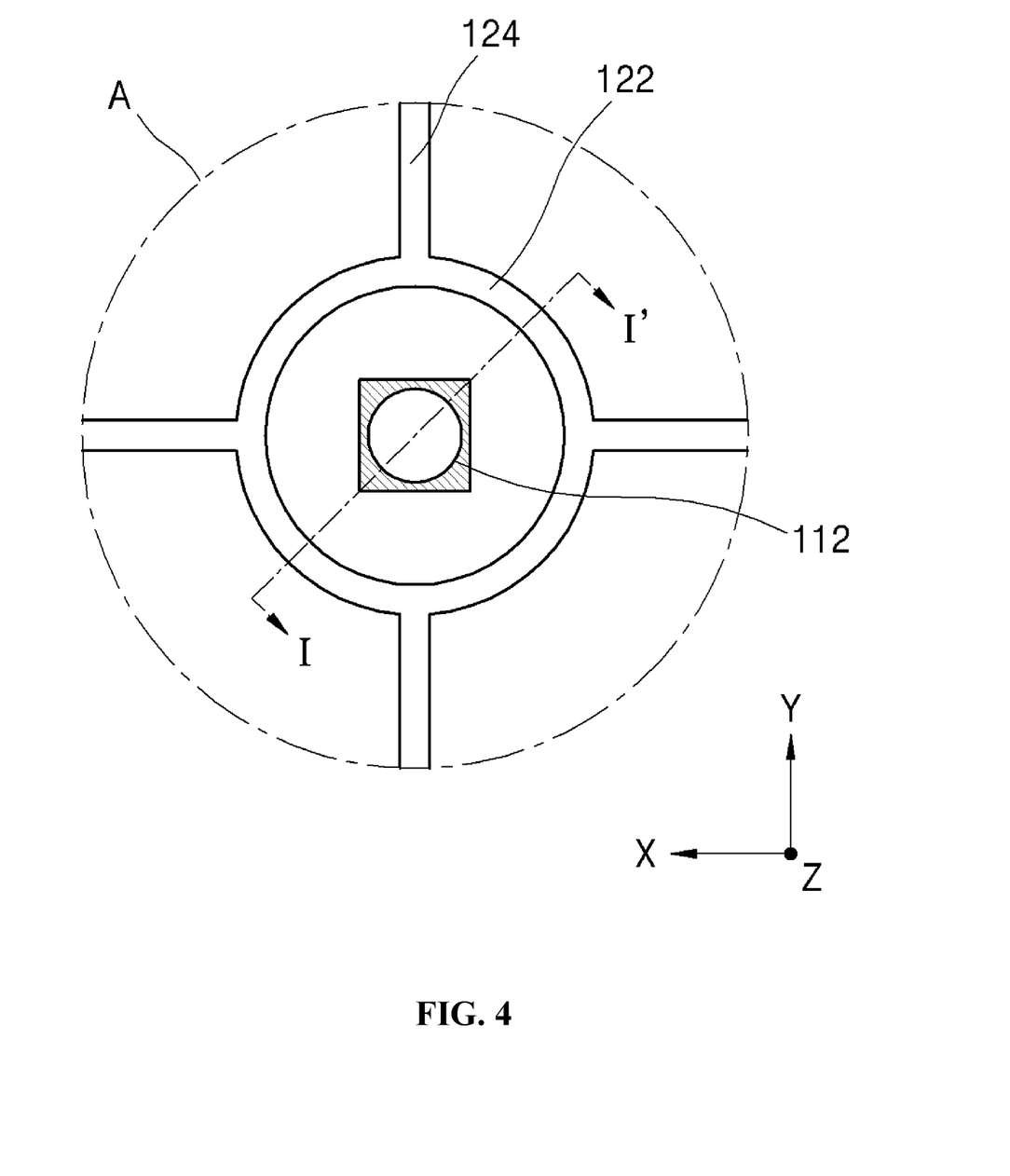
FIG. 4 shows an enlarged plan view of part A illustrated in FIG. 3.
Figure 5:
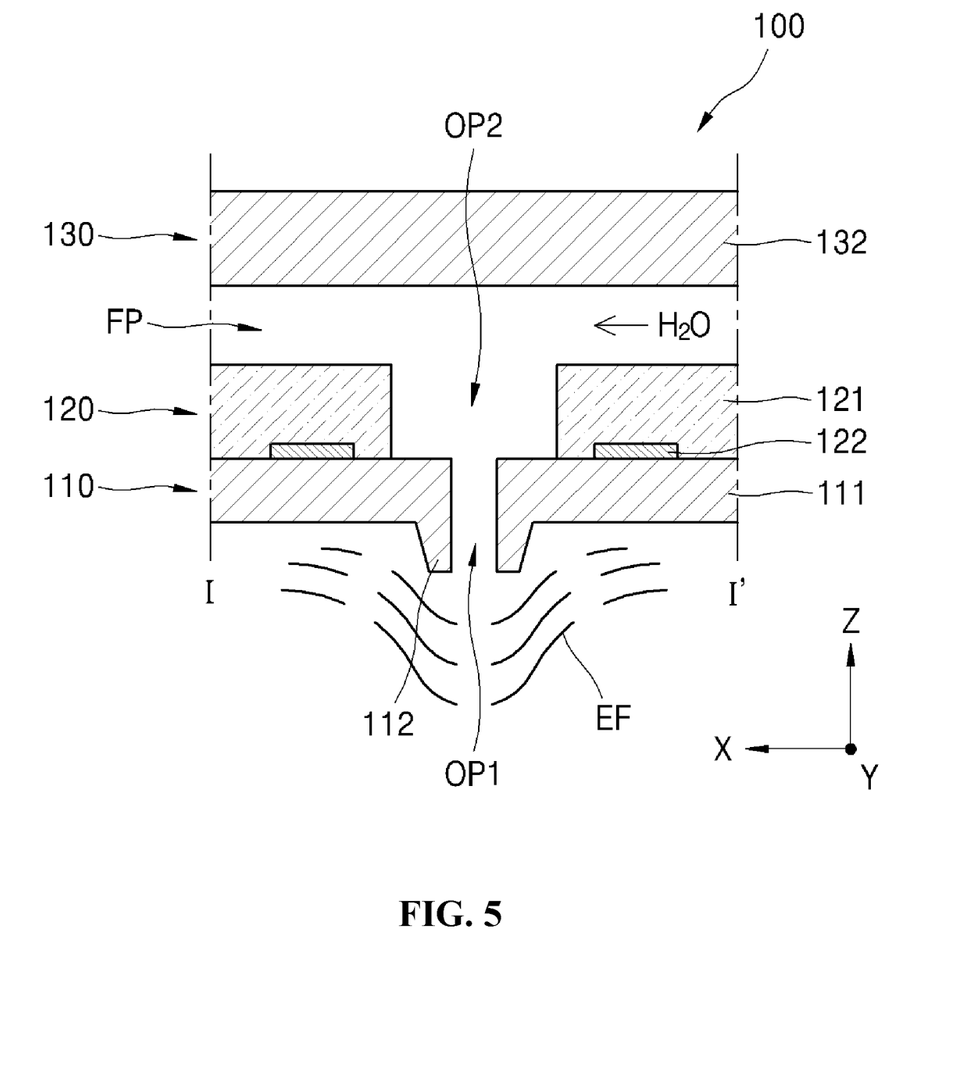
FIG. 5 shows a cross-sectional view schematically illustrating an example of the cross-section taken along line I-I' illustrated in FIG. 4.
Figure 6:
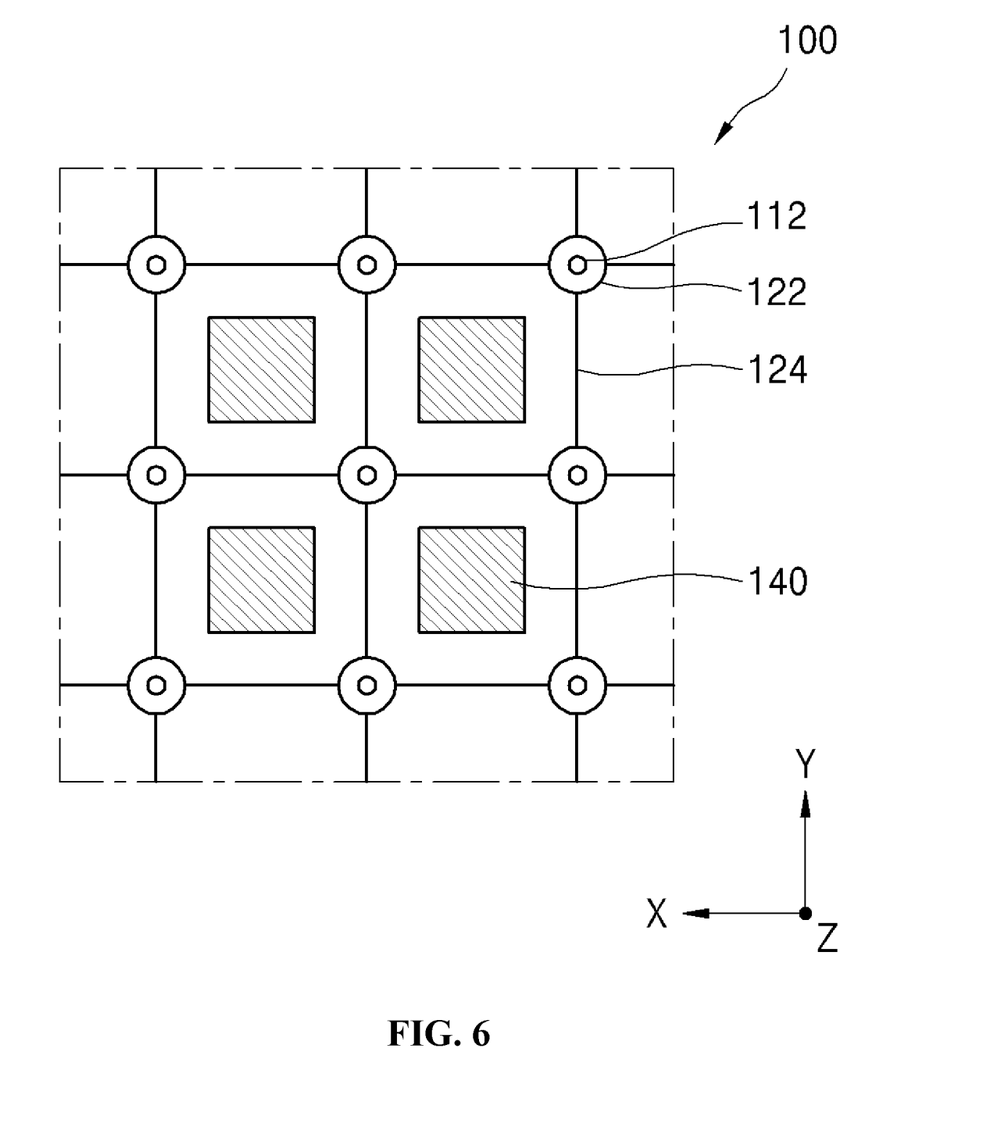
FIG. 6 shows a plan view schematically showing a portion of the cover of FIG. 3.

FIG. 3 shows a plan view schematically showing an example of a cover illustrated in FIG. 2, FIG. 4 shows an enlarged plan view of part A illustrated in FIG. 3, FIG. 5 shows a cross-sectional view schematically illustrating an example of the cross-section taken along line I-I' illustrated in FIG. 4, and FIG. 6 shows a plan view schematically showing a portion of the cover of FIG. 3.

Hereinafter, embodiments will be described in connection with, for convenience of description, the cover 100 in FIGS. 3 to 6. However, the wall portion (200 in FIG. 2) may also have the same configuration as the cover 100. FIGS. 3 to 6 illustrate the bottom surface of the cover 100.

First, as shown in FIG. 5, the cover 100 may include a first film 110, a second film 120, and a third film 130, which are sequentially stacked.

The first film 110 may include a plurality of micro nozzles 112 through which water is sprayed into the inner space of the sterilizing unit (10 in FIG. 2). For example, the first film 110 may include a first base layer 111 and the plurality of micro nozzles 112 protruding outward from the surface of the first base layer 111.

The first base layer 111 may be a transparent film. The first base layer 111 may include polyimide, acrylic, polycarbonate, polyethylene terephthalate, polyethylene, polypropylene, polysulfone, polymethyl methacrylate, triacetylcellulose, polydimethylsiloxane, etc.

Each of the plurality of micro nozzles 112 may have a shape in which a width thereof is gradually decreased in a direction in which the plurality of micro nozzles 112 protrude from the surface of the first base layer 111. Each of the plurality of micro nozzles 112 may have a truncated column shape such as a polygonal truncated column, a truncated cone, etc. In addition, a first opening OP1 formed in the center of the micro nozzle 112 may extend through the first base layer 111 with a predetermined width.

For example, the micro nozzle 112 may have a quadrangular truncated shape. At this time, the base of the quadrangular truncated shape, which is in contact with the surface of the first base layer 111, has a width of 150 μm or less, a length of 150 μm or less, and a height of 50 μm or more, and a diameter of the first opening OP1 in the micro nozzle 112 may be about 50 μm. As such, since each of the micro nozzles 112 has a micro size and a truncated column shape, a starting voltage of the electrostatic spray may be reduced and the fine droplets may be easily sprayed, so that the spraying may be performed more stably.

As shown in FIG. 3, the plurality of micronozzles 112 may be spaced apart from each other at regular intervals. For example, the interval between the micronozzles 112 may be 1 mm to 3 mm.

The second film 120 may include a plurality of surrounding electrodes 122 corresponding to the plurality of micro nozzles 112, respectively. Specifically, the second film 120 may include a second base layer 121, and the plurality of surrounding electrodes 122 may be positioned on the second base layer 121.

The second base layer 121 may be a transparent film. The second base layer 121 may include polyimide, acrylic, polycarbonate, polyethylene terephthalate, polyethylene, polypropylene, polysulfone, polymethyl methacrylate, triacetylcellulose, polydimethylsiloxane, etc.

The plurality of surrounding electrodes 122 may be inserted into a surface of the second base layer 121 and positioned in the second base layer 121. For example, the surface of the second base layer 121 and the surface of the plurality of surrounding electrodes 122 may be coplanar with each other, and the plurality of surrounding electrodes 122 may be in contact with the second base layer 121 and the first base layer 111 therebetween.

As shown in FIG. 4, in a plan view, the plurality of surrounding electrodes 122 may be arranged in such a configuration that each surrounding electrode 122 surrounds the corresponding nozzle 112. For example, the surrounding electrode 112 may have a circular or donut shape with a diameter of about 2 mm. The plurality of surrounding electrodes 112 may be spaced apart from each other and electrically connected with each other by a connection wire 124, so that the plurality of surrounding electrodes 112 may have the same electrical potential.

The plurality of surrounding electrodes 112 and the connection wire 124 may be integrally formed. For example, a plurality of grooves may be formed on the second base layer 121 at positions where the plurality of surrounding electrodes 112 and the connection wiring 124 are to be formed, and a conductive paste may be printed in the grooves by a screen printing, to thereby form the plurality of surrounding electrodes 112 and the connection wiring 124.

In another example embodiment, the plurality of surrounding electrodes 112 and the connection wiring 124 may be formed in the groove of the second base layer 121 by a deposition method or the like. At this time, a seed layer may be formed in the grooves of the second base layer 121 by the screen printing in advance so as to facilitate the deposition of the surrounding electrodes 112 and the connection wiring 124.

A constant voltage may be applied to the plurality of surrounding electrodes 112 and the connection wiring 124 by an electric power unit (20 of FIG. 2). As described above, when a voltage is applied to the plurality of surrounding electrodes 112, the electric field EF may be concentrated around an end portion of the nozzle 112, and thus the droplets may be sprayed more stably and the starting voltage of the electrostatic spray may be reduced, to thereby improve the spray efficiency of the electrostatic spray. For example, when no surrounding electrode 112 is provided, the voltage applied to the water may be 9 kV for performing the electrostatic spray, however, when a voltage of 5V is applied to the surrounding electrode 112, the voltage applied to the water may be reduced to 1 to 2 kV for performing the electrostatic spray. Particularly, the first pipe 22 and the pump P need be made of an insulating material for applying a high voltage to the water.

In addition, when a voltage is applied to the plurality of surrounding electrodes 112, heat is generated by the resistance of the surrounding electrodes 112 and the temperature of the water passing through the micro nozzle 112 may be increased. When the temperature of the water is increased, the evaporation rate of the droplets may be increased, which is advantageous for particulates, and the surface tension of the water may be decreased, which reduces the start voltage of the electrostatic spray, so that the spray efficiency of the nozzle 112 may be improved.

The third film 130 may be stacked on the second film 120. The third film 130 may include a third base layer 132 and a flow path FP in the third base layer 132.

The third base layer 132 may be a transparent film. The third base layer 132 may include polyimide, acrylic, polycarbonate, polyethylene terephthalate, polyethylene, polypropylene, polysulfone, polymethyl methacrylate, triacetylcellulose, polydimethylsiloxane, etc.

The flow path FP is a passage through which water ($H_2O$) supplied from the fuel cell of the electric power unit (20 in FIG. 2) flows, and may be a groove formed on the surface of the third film 130 facing the second film 120. The flow path FP may have a shape, such as a mesh pattern, in which the plurality of micro nozzles 112 are connected.

In addition, the cover 100 and the wall portion (200 in FIG. 2) may have the same structure, and the flow path FP formed in the cover 100 and the flow path FP formed in the wall portion (200 in FIG. 2) may be connected to each other. Therefore, when the first pipe (22 in FIG. 2) is connected to the cover 100, the water (H₂O) supplied to the cover 100 may be sprayed from the cover 100 and the wall portion (200 in FIG. 2) to the inner space of the sterilizing unit (10 in FIG. 2).

In an embodiment, even when the cover 100 and the wall portion (200 in FIG. 2) may have the same structure, and the flow path FP formed in the cover 100 and the flow path FP formed in the wall portion (200 in FIG. 2) may not be connected to each other. In this case, the first pipe (22 in FIG. 2) may be connected to each of the cover 100 and the wall portion (200 in FIG. 2), so that water (H₂O) may be separately supplied to the cover 100 and the wall portion (200 in FIG. 2).

Particularly, as the water H₂O discharged from the fuel cell is ultrapure water and has low electrical conductivity, the water H₂O discharged from the fuel cell may be advantageous for electrostatic spraying, and as the water H₂O discharged from the fuel cell does not include foreign substances or ions, the problems regarding the micro nozzle 112, such as a nozzle clogging, may be prevented.

As described above, water (H₂O) flowing through the flow path FP of the third film 130 may be supplied to the micro nozzle 112, and by applying a voltage for electrostatic spraying, sprayed through the micro nozzle 112. To this end, the second film 120 may include a plurality of second openings OP2 that are arranged at positions overlapping the plurality of micro nozzles 112. The plurality of second openings OP2 connect the plurality of micro nozzles 112 to the flow path FP. In this case, a width of the second opening OP2 may be greater than that of the first opening OP1 that is provided at the center of the micro nozzle 112, and thus the flow rate of the water which has flown out through the first opening OP1 may be increased. In addition, the plurality of surrounding electrodes 122 may be arranged in such a configuration that a plurality of second openings OP2 are surrounded by the plurality of surrounding electrodes 122, respectively, and thus the water H₂O may be heated when passing through the second openings OP2, thereby increasing the electrostatically spraying effect.

As such, according to the present disclosure, by spraying ultrapure water discharged from the fuel cell of the electric power unit (20 in FIG. 2) through the plurality of micro nozzles 112 having a micro-sized truncated column shape, the spraying efficiency can be improved electrostatically.

Meanwhile, after sterilization and disinfection of the article (C in FIG. 2) is completed using electrostatically spraying and ultraviolet light, the article (C in FIG. 2) may be dried by the surrounding electrodes 112. For example, after sterilization and disinfection of the article (C in FIG. 2) is completed, the supply of water (H₂O) to the flow path FP is stopped by the pump (P in FIG. 2), and voltage is applied to the surrounding electrodes 112 to heat the inside of the sterilizing unit (10 in FIG. 2) to dry the article (C in FIG. 2).

Figure 7:
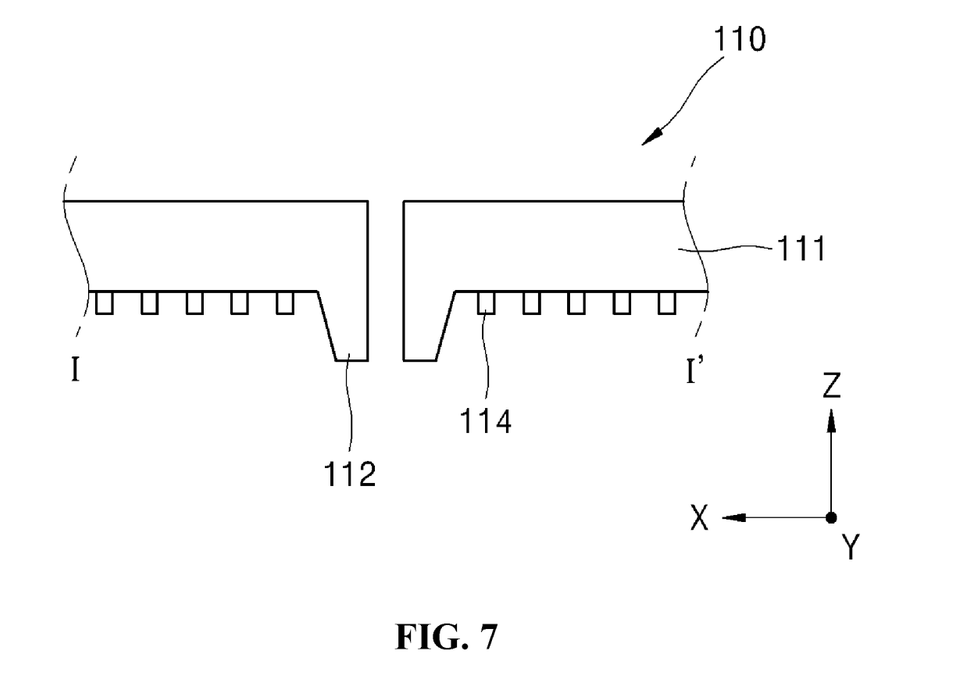
FIG. 7 shows a cross-sectional view schematically illustrating another example of the cross-section taken along line I-I' illustrated in FIG. 4.

FIG. 7 shows an enlarged view of a portion of the bottom surface of the cover 100. As described above, the plurality of micro nozzles 112 are disposed to be spaced apart from each other, and the plurality of surrounding electrodes 122 may be respectively disposed to surround the micro nozzles 112 in a plan view. In addition, the plurality of surrounding electrodes 122 may be electrically connected to each other by the connection wiring 124.

In addition, a light-emitting device 140 may be disposed on the cover 100. The light-emitting device 140 may be, for example, a light-emitting diode that emits ultraviolet light, and may sterilize the article (C in FIG. 2) by irradiating ultraviolet light to the article (C in FIG. 2).

The light-emitting device 140 may be disposed on the lower surface of the cover 100. For example, a flexible printed circuit board (FPCB) may be positioned on the lower surface of the cover 100, and the light-emitting device 140 may be mounted on the FPCB. In another example embodiment, the light-emitting device 140 may be positioned on an upper surface of the cover 100. Since the cover 100 according to the present disclosure may be formed of a transparent film, even when the light-emitting device 140 is located on the upper surface of the cover 100, light generated from the light-emitting device 140 may be supplied to the article (C in FIG. 2).

The light-emitting device 140 may be disposed at a position that does not overlap the surrounding electrodes 122 and the connection wiring 124. For example, a single light emitting device 140 may be positioned in an area defined by four surrounding electrodes 122 and a connection wiring 124 connecting the four surrounding electrodes 122. Therefore, the heat generated by the surrounding electrode 122 and the connection wiring 124 may affect less.

On the other hand, since the light generated from the light-emitting device 140 has straightness, the light may reach the curved or shaded part of the article (C in FIG. 2), and the part where the ultraviolet light does not reach, may not be sterilized by ultraviolet light. However, according to the present disclosure, by spraying water electrostatically from the cover 100 and the wall portion (200 in FIG. 2), sprayed droplets having a sterilizing effect may reach a location where ultraviolet light cannot reach.

When water (H₂O) is electrostatically sprayed, the water may be ionized to the fine water droplets having strongly reactive negative ions, such as hydroxyl radical and superoxide radical, and the fine water droplets may be sprayed. Thus, as having high reducibility, the negative ions strongly react with positive hydrogen ions in microbial membranes or viruses existing on the surface of the article C and are reduced to water. Accordingly, the microbes and viruses may be inactivated by those processes.

Therefore, according to the present disclosure, the sterilization and disinfection efficiency of the sterilizing unit (10 in FIG. 2) can be improved by irradiating ultraviolet light to the article (C in FIG. 2) and at the same time, spraying water (H₂O) electrostatically.

FIG. 7 shows a cross-sectional view schematically illustrating another example of the cross-section taken along line I-I' illustrated in FIG. 4.

FIG. 7 illustrates only the first film 110 for convenience of description. Referring to FIG. 4, a plurality of protrusions 114 may be further provided on the surface of the first base layer 111. The plurality of protrusions 114 are disposed around the micro nozzle 112.

The plurality of protrusions 114 may be shorter than the micro nozzle 112. For example, the plurality of protrusions 114 may have a height of 20 μm or less. In addition, the plurality of protrusions 114 may have hydrophobicity. The protrusions 114 may prevent the droplets from forming into drops on the micro nozzle 112, to thereby improve the efficiency of electrostatic spray.

On the other hand, when the light-emitting element (140 in FIG. 6) is disposed on the lower surface of the first film 110, the protrusions 114 may not be formed at the position where the FPCB or the light-emitting element (140 in FIG. 6) is disposed.

Although the present disclosure has been described with reference to an embodiment shown in the drawings, this is merely an example, and it will be understood by a person skilled in the art that various modifications and embodiments may be allowable therefrom. Therefore, the true technical protection scope of the present disclosure should be determined by the technical spirit of the appended claims.

The invention claimed is:

1. A sterilizing device comprising:
   a wall portion defining an inner space together with a bottom where an article to be sterilized and disinfected is located; and
   a cover located on the wall portion and covering the inner space, wherein
   each of the cover and the wall portion comprises
   a first film having a plurality of micro nozzles through which water is electrostatically sprayed into the inner space; and
   light-emitting elements irradiating ultraviolet light to the article.

2. The sterilizing device of claim 1, wherein
   the first film includes a first base layer that is a transparent film, and
   each of the plurality of micro nozzles has a truncated column shape protruding outward from a surface of the first base layer.

3. The sterilizing device of claim 1, wherein
   each of the cover and the wall portion further comprises
   a second film located on the first film and having a plurality of surrounding electrodes respectively corresponding to the plurality of micro nozzles, wherein,
   in a plan view, the plurality of surrounding electrodes are disposed to surround the plurality of micro nozzles, respectively, and a voltage is applied to the plurality of surrounding electrodes.

4. The sterilizing device of claim 3, wherein
   each of the cover and wall portion further comprises
   a third film disposed on the second film and including a flow path for supplying the water to the plurality of micro nozzles, wherein
   the second film includes a plurality of openings at positions overlapping the plurality of micro nozzles, and the plurality of openings connect the plurality of micro nozzles to the flow path, and
   the plurality of surrounding electrodes are arranged to surround each of the plurality of openings, and heat the water that passes through the plurality of openings.

5. The sterilizing device of claim 1, further comprising
   an electric power unit including a fuel cell supplying the water to a sterilizing unit together with power.

6. The sterilizing device of claim 5, wherein
   the fuel cell is a polymer electrolyte fuel cell, and
   a humidified air in the sterilizing unit is supplied to the fuel cell.

* * * * *